US009682444B2

(12) United States Patent
Kraft et al.

(10) Patent No.: US 9,682,444 B2
(45) Date of Patent: Jun. 20, 2017

(54) METHOD AND SYSTEM FOR MANUFACTURING MICRODOTS

(71) Applicant: DATADOT TECHNOLOGY LIMITED, Frenchs Forest, New South Wales (AU)

(72) Inventors: John Peter Kraft, Newport (AU); Geoffrey Michael George, Epping (AU); Brent D. McLaws, Spokane, WA (US)

(73) Assignee: DATADOT TECHNOLOGY LIMITED, New South Wales (AU)

( * ) Notice: Subject to any disclaimer, the term of this patent is extended or adjusted under 35 U.S.C. 154(b) by 0 days.

(21) Appl. No.: 14/766,549

(22) PCT Filed: Feb. 6, 2014

(86) PCT No.: PCT/US2014/015117
§ 371 (c)(1),
(2) Date: Aug. 7, 2015

(87) PCT Pub. No.: WO2014/124147
PCT Pub. Date: Aug. 14, 2014

(65) Prior Publication Data
US 2015/0367449 A1     Dec. 24, 2015

(30) Foreign Application Priority Data

Feb. 7, 2013   (AU) ................................ 2013900390

(51) Int. Cl.
*B23K 26/362*     (2014.01)
*B23K 26/40*      (2014.01)
(Continued)

(52) U.S. Cl.
CPC ............ *B23K 26/362* (2013.01); *B23K 26/00* (2013.01); *B23K 26/0093* (2013.01);
(Continued)

(58) Field of Classification Search
CPC .... B23K 26/20; B23K 26/08; B23K 26/0093; B23K 26/362; B23K 26/38; B23K 26/40
(Continued)

(56) References Cited

U.S. PATENT DOCUMENTS 4,243,734 A * 1/1981 Dillon .............. G06K 19/06009
                                                    283/70
5,429,392 A * 7/1995 Loving ................ G02B 5/0252
                                                    283/72

(Continued)

FOREIGN PATENT DOCUMENTS

| GB | 2407798 A | * 11/2005 |
| GB | 2407798 A |   11/2005 |
| WO | 2010099765 A2 | 9/2010 |

OTHER PUBLICATIONS

International Search Report for International Application No. PCT/US2014/015117, Mar. 11, 2014, 3 pages.

*Primary Examiner* — Samuel M Heinrich
(74) *Attorney, Agent, or Firm* — Armstrong Teasdale LLP

(57) ABSTRACT

Methods and systems for manufacturing microdots are disclosed. One such method comprises the steps of: causing one or both of a substrate and a computer controlled laser apparatus (810) to move relative to the other; using the computer controlled laser apparatus to write selected data at regular intervals on the substrate (820); and cutting a plurality of microdots from the substrate (830). Each of the microdots comprises a portion of the substrate having the selected data written thereon.

12 Claims, 5 Drawing Sheets

(51) Int. Cl.
 *B23K 26/08* (2014.01)
 *B23K 26/38* (2014.01)
 *B23K 26/00* (2014.01)
 *B42D 25/475* (2014.01)
 *B42D 25/435* (2014.01)
 *B26F 1/24* (2006.01)
 *B42D 25/41* (2014.01)
 *B42D 25/324* (2014.01)
 *B42D 25/355* (2014.01)
 *B42D 25/373* (2014.01)
 *B42D 25/36* (2014.01)

(52) U.S. Cl.
 CPC .............. *B23K 26/08* (2013.01); *B23K 26/38* (2013.01); *B23K 26/40* (2013.01); *B26F 1/24* (2013.01); *B42D 25/324* (2014.10); *B42D 25/355* (2014.10); *B42D 25/36* (2014.10); *B42D 25/373* (2014.10); *B42D 25/41* (2014.10); *B42D 25/435* (2014.10); *B42D 25/475* (2014.10); *Y10T 29/49996* (2015.01); *Y10T 83/173* (2015.04)

(58) Field of Classification Search
 USPC .............. 219/121.6, 121.67, 121.72, 121.85
 See application file for complete search history.

(56) References Cited

U.S. PATENT DOCUMENTS

| | | | |
|---|---|---|---|
| 5,635,321 A * | 6/1997 | Van Hunsel | G03F 7/2055 358/480 |
| 6,774,340 B1 | 8/2004 | Chiba | |
| 7,810,725 B2 * | 10/2010 | Benderly | G06K 19/06046 235/385 |
| 2007/0240325 A1* | 10/2007 | Pelsue | B41M 5/24 33/707 |
| 2013/0017940 A1* | 1/2013 | Bonariva | B31B 1/20 493/59 |
| 2013/0320276 A1* | 12/2013 | Farrell | B29C 65/1635 252/582 |

* cited by examiner

METHOD AND SYSTEM FOR MANUFACTURING MICRODOTS

TECHNICAL FIELD

The present invention relates to taggants bearing data such as microscopic visual indicia, otherwise known as microdots.

BACKGROUND

Microdots and other taggants or identification devices are commonly attached to or incorporated within items of value in order to identify ownership or origin and to hinder theft, diversion, or illegal use of such items. Typical examples of such items include, but are not limited to, motor vehicles, motorcycles, machinery, equipment, branded products, spirits, high-value consumer goods, documents, storage media, and financial and other instruments.

For at least the last sixty years, exceedingly small photographic reproductions have been employed to confidentially communicate sensitive information. In such techniques, letter-sized documents have, for example, been copied onto a "microdot" no larger than a typewritten period. Such microdots may be physically hidden as periods in written or typewritten communications. The data borne by the microdot may be read by observing the microdot using a suitable microscope or other optical magnification means. Such microdots are typically circular with a diameter of approximately 1 millimeter and a thickness of a fraction of a millimeter.

Microdots of the type referred to above typically have flat surfaces bearing repetitive identifying indicia, such as numeric and alpha-numeric characters, which can be visually interpreted or retrieved under magnification. The indicia, whose smallest features (e.g., the middle stroke on a capital "E" character) are typically 2-5 micrometers in size, may provide part or all of a code that uniquely identifies the object to which a microdot is attached. On account of being exceedingly small, such microdots are generally not readily apparent to the naked human eye when attached to an item of value. Multiple microdots may be attached at different locations on the item, thus making complete removal of the microdots effectively impossible and thereby hindering attempts to hide the ownership or origin of the item.

Traditional methods of manufacturing metallic microdots employed combinations of holographic, photoresist, electroplating and metal-etching techniques. Traditional metallic microdots:
  are exceedingly laborious and expensive to produce with
    significant amounts of the production being done literally by hand (thereby leading to high cost);
  in the case of holographic dots, require the use of an
    e-beam machine and several weeks lead-time in order
    to produce a holographic master;
  in the case of non-holographic dots, require one to two
    weeks in order to commission the variable data master;
  can only be created from metal elements that are capable
    of being deposited by electroplating methods and/or
    etched by acid and are thus almost exclusively made of
    nickel; and
  require the use of galvanic baths and or acid processes.

A need therefore exists for alternative and new methods that are more suitable for mass production of microdots.

SUMMARY

An aspect of the present invention provides method for manufacturing microdots. The method comprises the steps of: causing one or both of a substrate and a computer controlled laser apparatus to move relative to the other; using the computer controlled laser apparatus to write selected data at regular intervals on the substrate; and cutting a plurality of microdots from the substrate. Each of the microdots comprises a portion of the substrate having the selected data written thereon.

Another aspect of the present invention provides a system for manufacturing microdots, said system comprising: a computer controller laser apparatus; a transport apparatus adapted to cause one or both of a computer controller laser apparatus and a substrate to move relative to the other; and a cutting apparatus adapted to cut microdots from the substrate. The computer controlled laser apparatus is adapted to write selected data at regular intervals on the substrate.

In one embodiment, the transport apparatus comprises a tape drive adapted to move said substrate past said computer controlled laser apparatus.

Selected data may be written on both sides of said substrate. The plurality of microdots may be cut from the substrate using a mechanical cutting apparatus, the computer controlled laser apparatus, or a laser cutting apparatus separate from the computer controlled laser apparatus.

BRIEF DESCRIPTION OF THE DRAWINGS

A small number of embodiments of the present invention are hereinafter described, by way of example only, with reference to the accompanying drawings in which.

DETAILED DESCRIPTION

Embodiments of the present invention are described herein for with reference to a stainless steel tape substrate or feedstock. However, it is not intended that the present invention be limited in this manner. For example, other substrates (in either tape form or otherwise) may be practised, including polymer, ceramic and other metallic substrates.

Embodiments of the present invention are described herein with reference to using a laser to 'write' data to a substrate. It is intended that the term 'write' be construed in a broad sense, in that 'using a laser to write data to a substrate' is intended to include (but is not limited to):
- using a laser to ablate the substrate;
- using a laser to discolour the substrate;
- using a first laser to ablate a mask on the substrate and a second laser to ablate data onto the substrate;
- using a laser to discolour the substrate in order to increase contrast;
- using a laser to ablate through anodising exposing the substrate below to increase contrast;
- using a laser to ablate through layers of a multi-layer substrate to expose different coloured layers in order to increase contrast; and
- using a laser to fuse or solidify a material such as metal, polymer, ceramic, etc. in layers to create micro-indicia. The laser may be used to create containers that hold the micro-indicia, in situ. The laser may also be used to create dispensing containers for the micro-indicia.

The largest dimension of the microdots is typically about 1 mm. However, in certain embodiments, the largest dimension of the microdots may be less than 50 µm.

Figure 1:
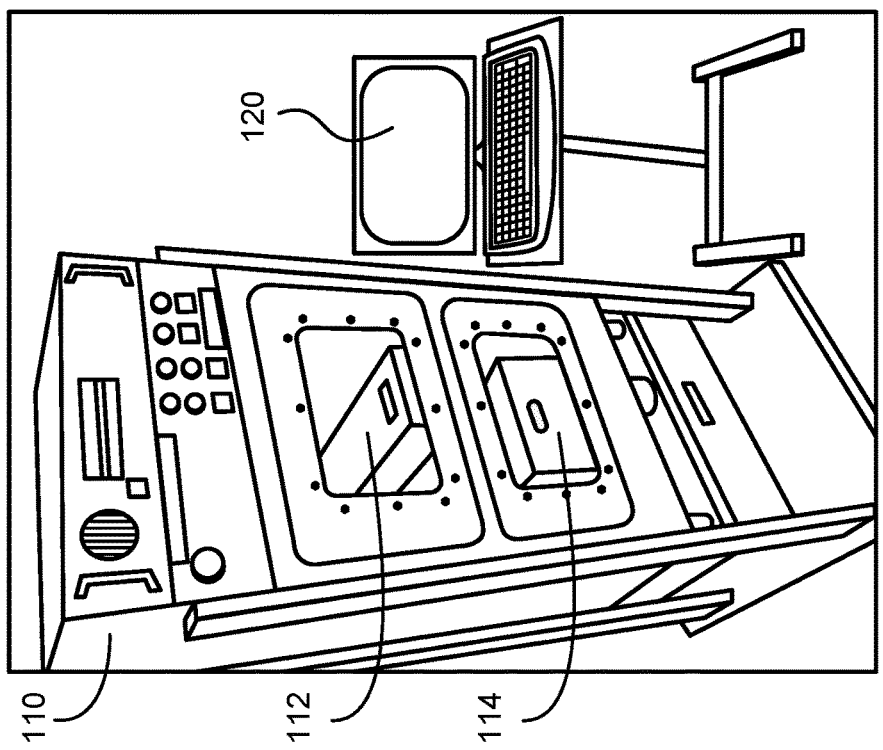
FIG. 1 shows a system for manufacturing microdots in accordance with an embodiment of the present invention.

FIG. 1 shows a system 100 for manufacturing microdots in accordance with an embodiment of the present invention. The system 100 is capable of writing data (either static or variable data) into or onto a substrate using a computer controlled laser apparatus. A galvo or other mechanism is used to steer the laser.

The system 100 comprises a vertical cabinet 110 and a computer control system 120. The vertical cabinet 110 comprises two laser-proof windows 112 and 114 through which the operational apparatus of the system 100 can be observed. A look through the upper window 112 reveals a computer controlled laser apparatus for writing data onto a substrate. A look through the lower window 114 reveals a tape drive that moves or propels a tape substrate or feedstock past the computer controlled laser apparatus.

The computer controlled laser apparatus of the present embodiment comprises an infra-red laser beam of wavelength 1964 nm controlled by the computer control system 120 for position (x, y, z, t), focus, beam width, beam focus, pulse shape, pulse energy, pulse firing and dwell time. The laser beam can write or mark the tape substrate by one or more of the following methods:
- ablating the surface of the tape substrate;
- melting the surface of the tape substrate;
- burnishing the surface of the tape substrate;
- exposing contrast layers in the surface of the tape substrate by ablation or melting; and
- cutting specific shapes into or from the tape substrate.

The tape drive behind the lower window 114 comprises a reel for the input tape substrate (i.e., pre laser writing), a reel for the output tape substrate (i.e., post laser writing), a drive unit comprising a servo motor and a friction drive that pushes the tape substrate or feedstock against a tension device, and several multi-grooved bobbins that enable accommodation of different tape substrate widths and laser writing on both sides of the tape substrate. The tape drive presently accommodates tape substrate widths of 0.5, 0.8 mm, 1.0 mm and 1.3 mm. However, other tape substrate widths could easily be accommodated. Furthermore, substrates other than in tape form can alternatively be practised.

Figure 2:
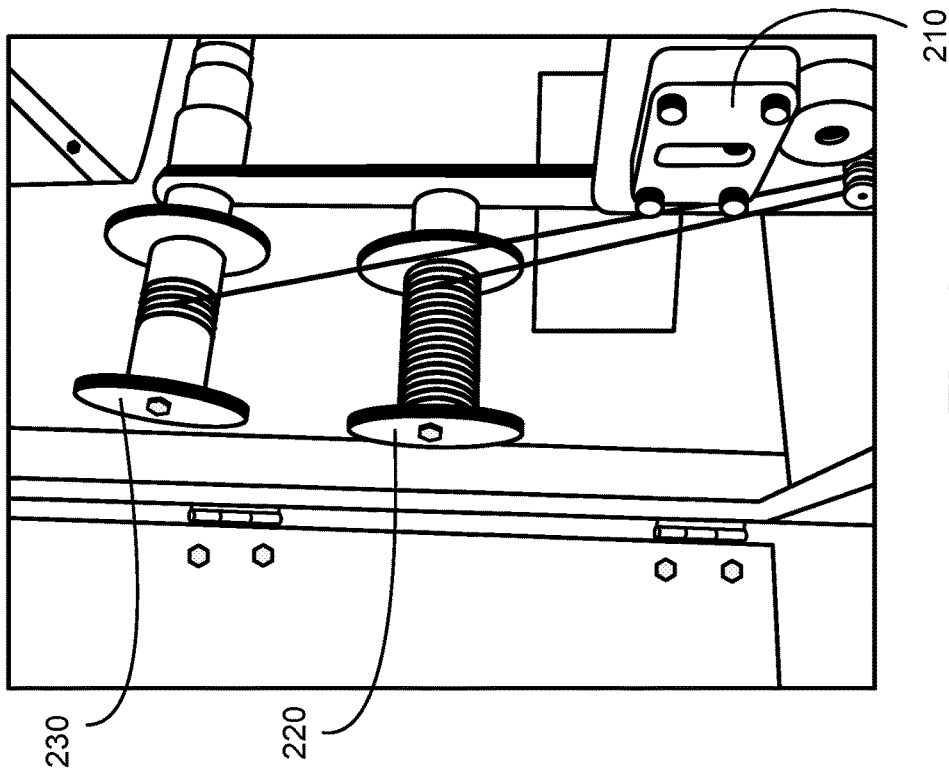
FIG. 2 shows a portion of a tape drive in the system of FIG. 1.

FIG. 2 shows a portion of the tape drive in the system 100 of FIG. 1. The tape drive unit 210 feeds or transfers tape substrate from an input tape substrate bobbin 220 (i.e., pre laser writing) via the computer controlled laser writing apparatus to an output tape substrate bobbin 230 (i.e., post laser writing). The tape drive unit 210 is capable of looping the tape substrate back such that both sides of the tape substrate are presented to the computer controlled laser apparatus and such that both sides of the tape substrate can be written on or marked substantially simultaneously. Different data may be written to each side of the tape substrate.

The embodiment described hereinbefore with reference to FIGS. 1 and 2 includes a tape drive adapted to move a substrate past a computer controlled laser apparatus. However, those skilled in the art would appreciate that, in alternative embodiments, one or both of the substrate and the computer controlled laser apparatus could be adapted to move relative to the other.

Individual microdots are produced by separating or cutting out appropriate portions of the tape substrate using a cutting apparatus. While a laser cutting apparatus produces high quality microdots, it is quite inefficient as cutting out a microdot in this manner takes approximately twenty times as long as the time required to laser write data to the microdot. Furthermore, high precision laser cutting apparatuses are expensive devices.

In an alternative embodiment, microdots are separated or cut from the tape substrate using a mechanical cutting apparatus. The mechanical cutting apparatus may, for example, comprise a guillotine, a punch, or any other mechanical cutting apparatus suitable for this purpose.

Figure 3:
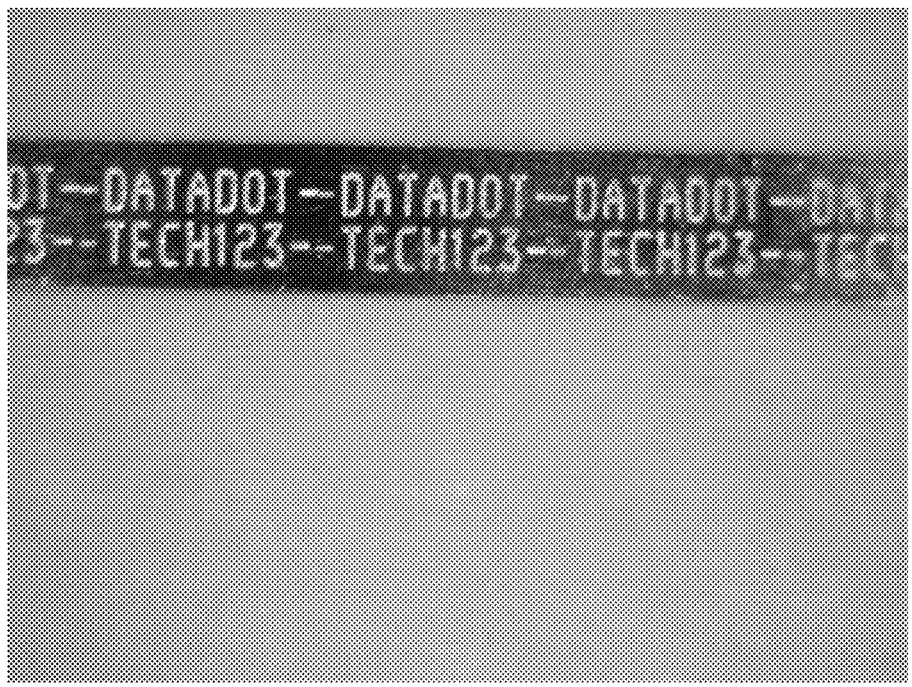
FIG. 3 shows a portion of stainless steel tape substrate with selected data written thereon using the system of FIG. 1.

FIG. 3 shows a portion of stainless steel 302 tape substrate or feedstock with data written thereon using the system 100 of FIG. 1. The specification of the stainless steel 302 tape substrate, which is available from Alloy Wire International, may be obtained at the URL: http://www.alloywire.com/alloy_stainless_steel_302.html.

Figure 4:
FIG. 4 shows a rectangular laser-cut microdot manufactured in accordance with an embodiment of the present invention.
Figure 5A:
FIG. 5A shows a circular laser-cut microdot manufactured in accordance with an embodiment of the present invention.
Figure 5B:
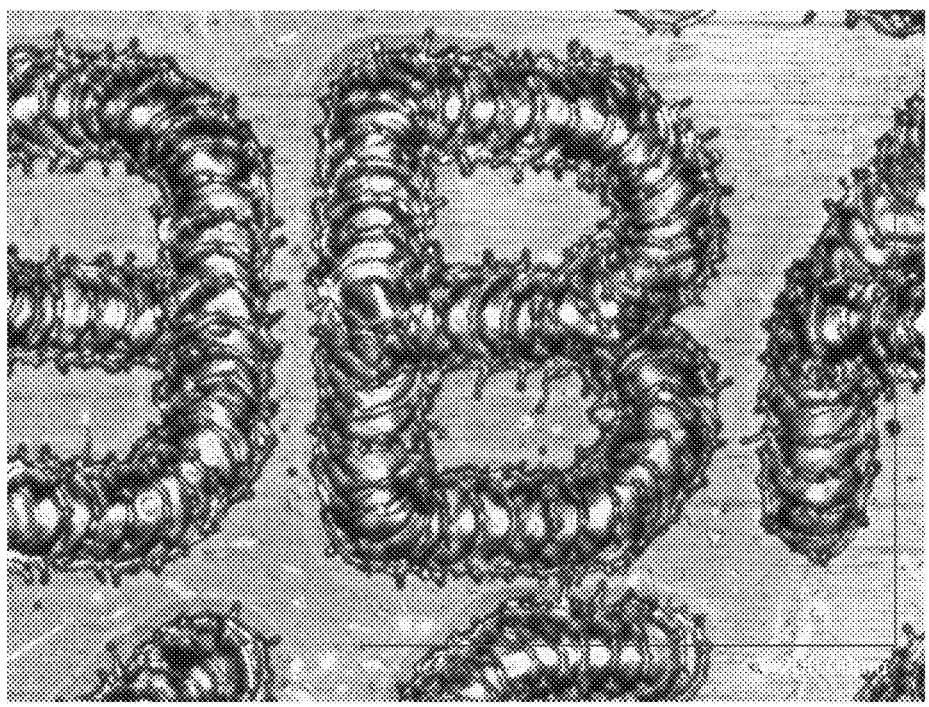
FIG. 5B shows an enlarged portion of the microdot shown in FIG. 6A.
Figure 6:
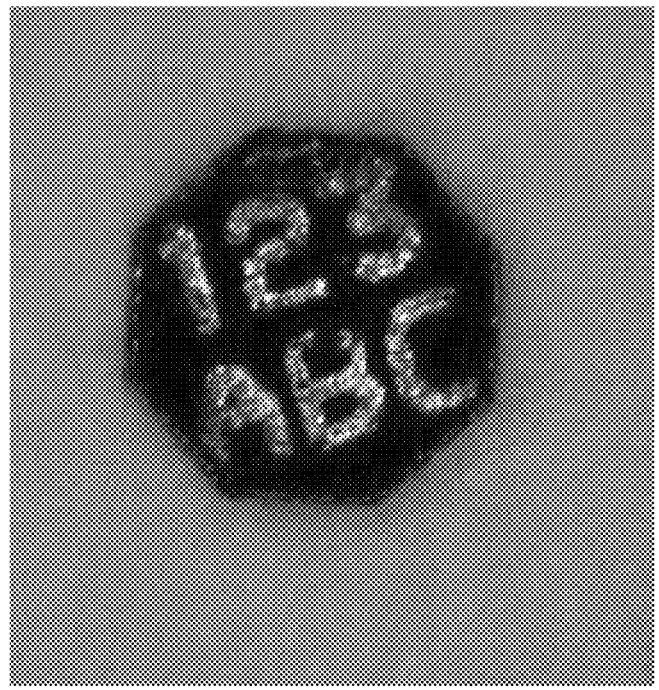
FIG. 6 shows an octagonal laser-cut microdot manufactured in accordance with an embodiment of the present invention.

FIGS. 4, 5A, and 6 show laser-cut microdots with text written thereon using the system 100 of FIG. 1. FIG. 5B shows an enlarged portion of the microdot in FIG. 5A.

Figure 7:
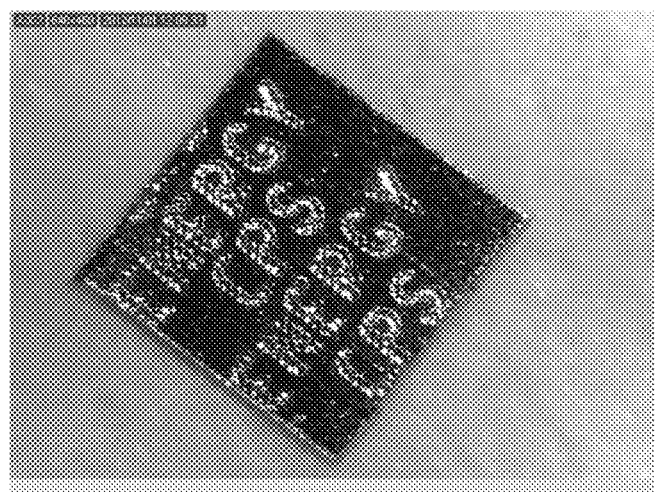
FIG. 7 shows a mechanically-cut microdot manufactured in accordance with an embodiment of the present invention.

FIG. 7 shows a microdot with text written thereon using the system 100 of FIG. 1. The microdot in FIG. 7 was separated from a tape substrate of stainless steel 302 independently of the system 100 using a guillotine (mechanical cutting apparatus). The approximate dimensions of the microdot in FIG. 7 are 1 mm square.

Figure 8:
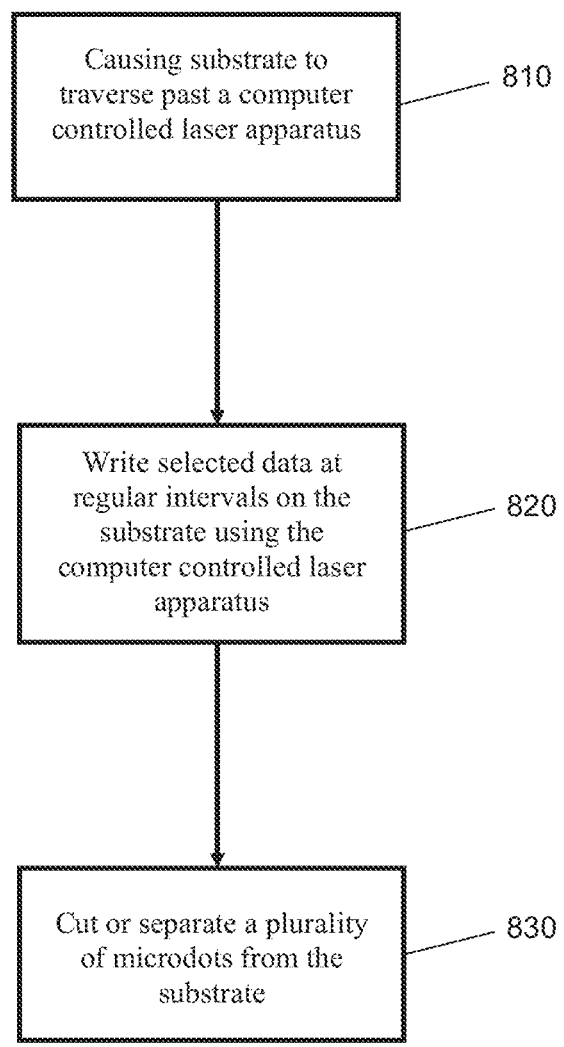
FIG. 8 is a flowchart of a method for manufacturing microdots in accordance with an embodiment of the present invention.

FIG. 8 is a flowchart of a method for manufacturing microdots in accordance with an embodiment of the present invention.

Referring to the method of FIG. 8, a substrate is caused to move or traverse past a computer controlled laser apparatus in step 810. In step 820, selected data is written at regular intervals on the substrate using the computer controlled laser apparatus. A plurality of microdots are cut or separated from the substrate in step 830. Each of the plurality of microdots comprises a portion of the substrate having the selected data written thereon.

Selected data (either the same or different selected data) may be written of both sides of the substrate.

The plurality of microdots may be separated from the substrate using a laser cutting apparatus, which may either comprise the computer controlled laser apparatus or a separate laser cutting apparatus. However, in a preferred economical embodiment, the plurality of microdots is separated from the substrate using a mechanical cutting apparatus such as a chopper or punch.

Embodiments of the present invention advantageously enable both variable and mass data to be generated or written on a wide variety of metallic, polymer and other substrates (including layered and composite substrates). Embodiments of the present invention also advantageously enable creation of metallic or other microdots on demand in real-time without the need for extended lead times.

The foregoing description provides exemplary embodiments only, and is not intended to limit the scope, applicability or configurations of the invention. Rather, the foregoing description of exemplary embodiments provides those skilled in the art with enabling descriptions for implementing one or more embodiments of the invention. Various changes may be made in the function and arrangement of elements and/or features without departing from the spirit and scope of the invention as set forth in the claims hereinafter.

The invention claimed is:

1. A method for manufacturing microdots, said method comprising the steps of:
   causing one or both of a substrate and a computer controlled laser apparatus to move relative to the other;
   using said computer controlled laser apparatus to ablate the substrate such that selected data is written at regular intervals on said substrate; and
   cutting a plurality of microdots from said substrate;
   wherein each of said microdots comprises a portion of said substrate having said selected data written thereon.

2. The method of claim 1, wherein the largest dimension of said plurality of microdots is about 1 mm.

3. The method of claim 1, wherein selected data is written on both sides of said substrate.

4. The method of claim 1, wherein said plurality of microdots is cut from said substrate using a mechanical cutting apparatus.

5. The method of claim 1, wherein said substrate comprises a stainless steel tape.

6. A system for manufacturing microdots, said system comprising:
   a computer controller laser apparatus;
   a transport apparatus adapted to cause one or both of a computer controller laser apparatus and a substrate to move relative to the other; and
   a cutting apparatus adapted to cut microdots from said substrate;
   wherein said computer controlled laser apparatus is adapted to ablate the substrate such that selected data is written at regular intervals on said substrate.

7. The system of claim 6, wherein said system is adapted to write selected data on both sides of said substrate.

8. The system of claim 6, wherein said cutting apparatus comprises said computer controlled laser apparatus.

9. The system of claim 6, wherein said cutting apparatus comprises a laser cutting apparatus separate from said computer controlled laser apparatus.

10. The system of claim 6, wherein said cutting apparatus comprises a mechanical cutting apparatus.

11. The system of claim 6, wherein said transport apparatus comprises a tape drive adapted to move said substrate past said computer controlled laser apparatus.

12. The system of claim 11, wherein said substrate comprises a stainless steel tape.

* * * * *